(12) United States Patent
Cattaruzzi (10) Patent No.: US 6,976,454 B2
(45) Date of Patent: Dec. 20, 2005

(54) APPARATUS FOR LOADING FOWL

(76) Inventor: Bruno Cattaruzzi, Via Tosio 15, Brescia (IT), 25100

( * ) Notice: Subject to any disclaimer, the term of this patent is extended or adjusted under 35 U.S.C. 154(b) by 640 days.

(21) Appl. No.: 09/740,966

(22) Filed: Dec. 21, 2000

(65) Prior Publication Data

US 2002/0078904 A1 Jun. 27, 2002

(51) Int. Cl.$^7$ .......................... A01K 29/00; B65G 15/00
(52) U.S. Cl. ........................................ 119/846; 119/845
(58) Field of Search .................................. 119/843–846

(56) References Cited

U.S. PATENT DOCUMENTS

| | | | | | |
|---|---|---|---|---|---|
| 3,958,536 A | * | 5/1976 | Crowder | .................... | 119/846 |
| 4,037,565 A | * | 7/1977 | Ledwell, Jr. | ................ | 119/846 |
| 5,361,727 A | * | 11/1994 | Berry | ......................... | 119/846 |
| 5,743,217 A | * | 4/1998 | Jerome | ....................... | 119/846 |

* cited by examiner

Primary Examiner—Son T. Nguyen
(74) Attorney, Agent, or Firm—Todd B. Murrah (57) ABSTRACT

An apparatus for capturing and loading fowl having a mobile frame to which a forward conveyor and a rearward conveyor are pivotally mounted. The forward conveyor has plurality of fingered drums that are rotated to engage the fowl and place them on the conveyor for movement to the frame. The forward and rearward conveyors are pivotally mounted for movement about a common vertical axis. Each conveyor may also be pivotal about a horizontal axis. The fowl are discharged from the forward conveyor onto the rearward conveyor which transports the fowl from the frame to storage cages. A rearward fingered drum is provided to engage the fowl and discharge the fowl from the conveyor and into a plurality of vertically stacked forming the cage compartments. The rearward conveyor includes a first rearward conveyor pivotally mounted to the frame and a second rearward conveyor slidibility connected to the first rearward conveyor. The rearward finger drums are automatically positioned adjacent the vertical storage compartments via linkage members connected to the first and second rearward conveyor which automatically urge the second rearward conveyor in sliding extension and retraction as the rearward conveyor is pivoted upward and downward, respectively. The linkage members also include a piston and shaft assembly for selectively extending and retracting the second rearward conveyor.

35 Claims, 11 Drawing Sheets

APPARATUS FOR LOADING FOWL

The present invention relates to the field of commercial farming of fowl and more particularly to apparatus for capturing fowl in mass quantities and expediently and safely loading the fowl into selected vertically disposed compartments of a storage cage. In even greater particularity, the present invention relates to mobile apparatus for catching fowl using rotatable finger drums for capturing the fowl and conveyors for moving the fowl to the storage cage.

BACKGROUND OF THE INVENTION

Apparatus having fingered drums for capturing fowl are commonly known in the industry. A good example of the use of fingered drums is shown in U.S. Pat. No. 4,508,062 issued to Berry et al. Two drums rotated in opposite directions and having flexible fingers thereon engage fowl coming in contact therewith and thrust the fowl rearward.

U.S. Pat. Nos. 4,900,292 and 5,259,811 also show the use of conveyors for conveying the captured fowl rearward from the rotating drums. More particularly these inventions show the use of a forward conveyor mounted for pivotal movement about a vertical axis in order that the rotating drums may be moved side to side to engage the fowl in a sweeping arc. It is also important to note that a second stationery conveyor is mounted rearward of the pivotal conveyors for receiving the fowl therefrom and conveying same to discharge drums similar in construction to the fingered drums previously described. These discharge drums engage and remove the fowl from the stationery conveyor though it is not clear from the patent how or in what type of compartments the fowl are stored.

The issues of discharge and storage are better addressed in U.S. Pat. Nos. 5,706,765 and 5,592,902 issued to Horton, which show a complex set of rearward conveyors each pivotally connected to the other for pivotal movement about horizontal axis such that the chain of conveyors can be raised and lowered to position a discharge end of the chain of conveyors proximate selected vertically stacked compartments forming a storage cage. The complex chain of conveyors must be individually maneuvered to position the discharge end in both vertically and horizontally selected points in space, preferably adjacent a compartment opening. It should also be noted that the rear chain of conveyors do not pivot laterally of a vertical plane passing through the longitudinal axis of the Horton inventions. The lack of horizontal lateral rotation limits the potential efficiency of operation by requiring the removal of a full storage cage before the positioning of a second storage cage adjacent the rearward chain of conveyors. What is not provided by the foregoing inventions is an apparatus for capturing and storing fowl that performs those functions set forth above but simplifies and hastens the positioning of the discharge end of a rearward conveyor both vertically and horizontally. The foregoing inventions also do not accommodate the positioning of the discharge end of the rearward conveyor both rearward and laterally of the subject inventions to accommodate access to multiple storage cages positioned about the inventions.

SUMMARY OF INVENTIONS

The principal object of the present invention, is to provide an apparatus for capturing and storing fowl that will accommodate the use of pivotally mounted forward conveyor assembly and a pivotally mounted rearward conveyor assembly that both pivot about a common vertical axis wherein the forward conveyor assembly can sweep laterally to capture fowl and will always deposit the fowl onto the rearward conveyor assembly which can concurrently pivot laterally to discharge the fowl into storage cages positioned both rearward and laterally of the present invention.

A second object of the present invention is to provide a rearward conveyor assembly that is pivotally mounted for vertical movement about a horizontal axis that will automatically extend and retract concurrently and responsive to the vertical movement of the rearward conveyor assembly such that a discharge end of the rearward conveyor assembly is automatically maintained proximate a selected vertical plane and substantially parallel to the openings of a plurality of vertically stacked compartments forming a storage cage.

In support of the second object, another object of the present invention is to provide apparatus for selectively adjusting the extension and retraction of said rearward conveyor to adjust the portion of the discharge end of the rearward conveyor relative to the selected opening.

A third object of the present invention is to provide apparatus that will allow the discharge of fowl from the forward conveyor should the fowl become too crowded thereon.

These and other objects and advantages of the present invention are accomplished through the use of a forward conveyor having a plurality of fingered rotating drums at one end thereof for engaging and conveying fowl to the forward conveyor. The forward conveyor also includes a plurality of flexible combs that define a portion of the conveyor and that will flex to allow the discharge of fowl from the conveyor proximate the drums when the fowl become too crowded. A mobile frame supports the forward conveyor which is secured to the frame by a primary slewing ring rotatably connected to the frame for rotational movement about a vertical axis. A primary slewing frame is connected to the primary slewing ring and supports the forward conveyor. The forward conveyor is pivotally mounted to the primary slewing frame for rotational movement about a horizontal axis. A rearward end of the forward conveyor extends above the primary slewing ring and remains in relative proximity to a shared vertical axis as the forward conveyor is pivoted horizontally about the primary slewing ring or vertically about the primary slewing frame.

A secondary slewing ring is rotatably mounted to a post forming a portion of the frame, which extends through the primary slewing ring and supports the secondary slewing ring above the primary slewing ring in coaxial relation thereto for rotational movement about the vertical axis. A secondary slewing frame is mounted to the secondary slewing ring. A first rearward conveyor is pivotally connected to the secondary slewing frame beneath the rearward end of the forward conveyor for movement about a horizontal axis.

A second rearward conveyor is slidably mounted to the underside of the first rearward conveyor for sliding movement therealong. A plurality of linkage members, are each pivotally connected to selected other linkage members and as a group are connected to the secondary slewing ring, the first rearward conveyor and the second rearward conveyor such that vertical movement of the first rearward conveyor in an upward direction will, via the linkage members, slidably extend the second rearward conveyor away from the frame. Downward movement of the first rearward member will, via the linkage, slidably retract the second rearward conveyor toward the frame.

One of the linkage members includes a hydraulic piston and shaft assembly that can be manually operated to adjust the extension or retraction of the second rearward conveyor.

BRIEF DESCRIPTION OF THE DRAWINGS

Apparatus embodying features of my invention are depicted in the accompanying drawings which form a portion of this disclosure and wherein.

DESCRIPTION OF A PREFERRED EMBODIMENT

Figure 1:
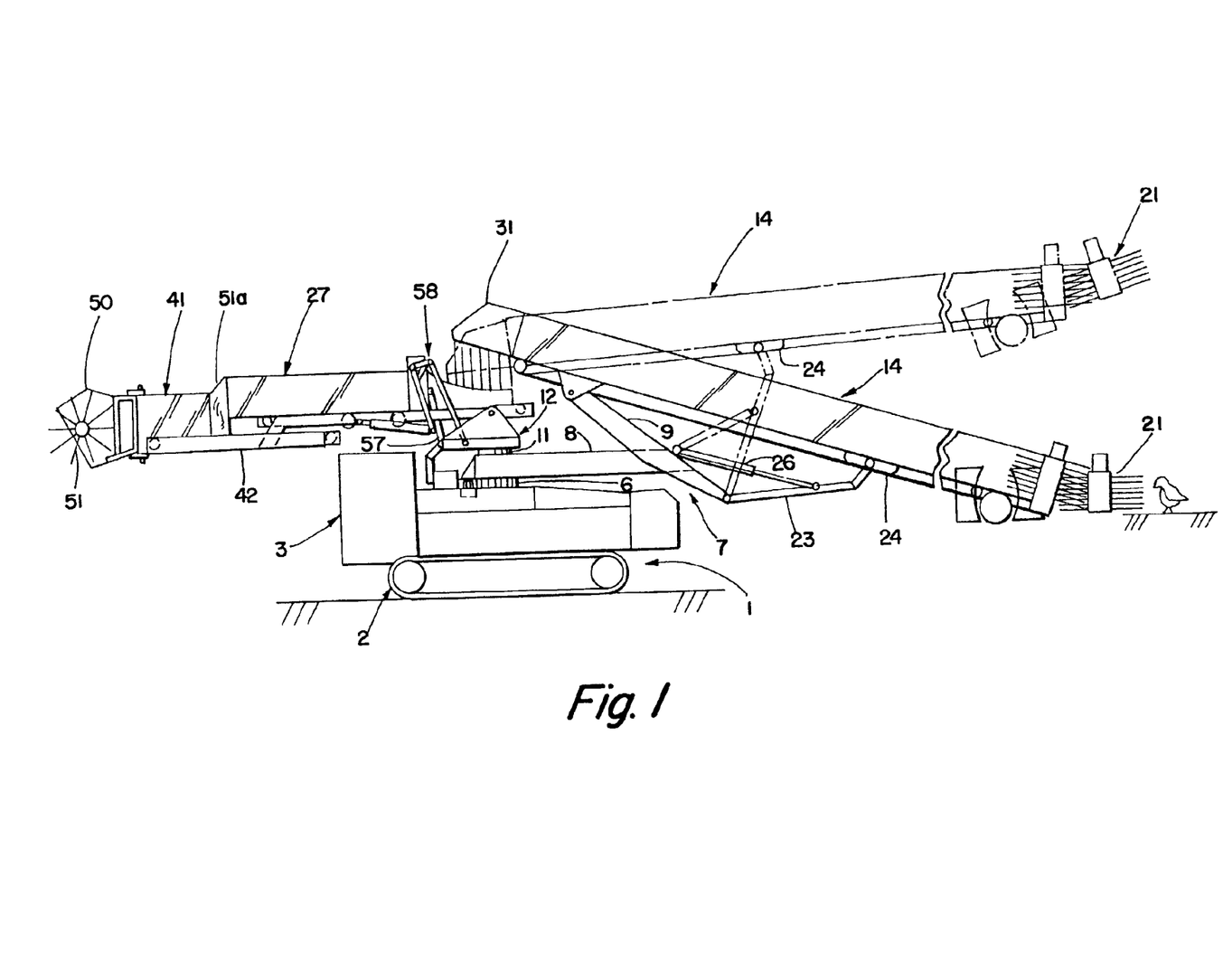
FIG. 1 is a side view of the present invention.
Figure 7:
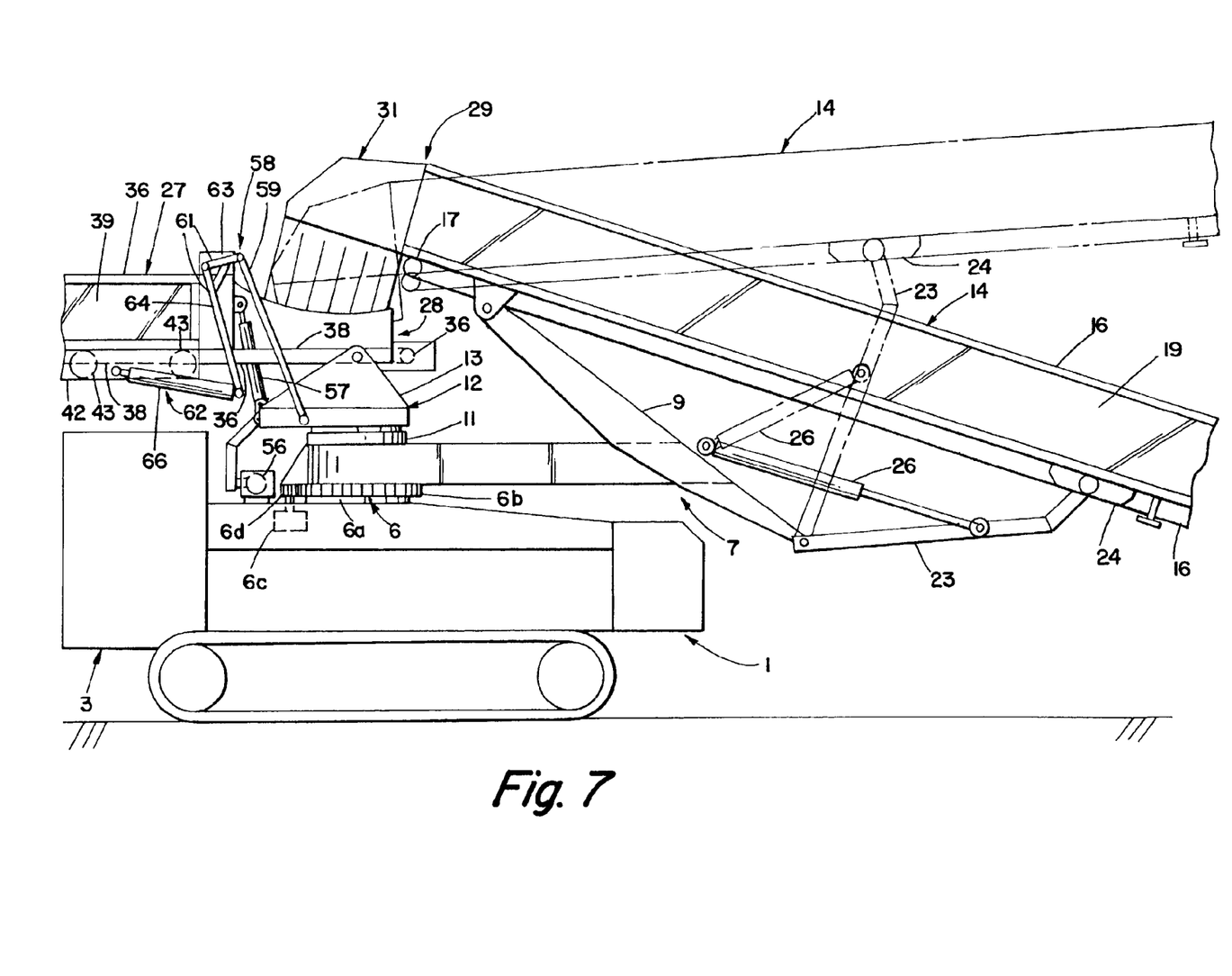
FIG. 7 is a detailed side view of the present invention.
Figure 9:
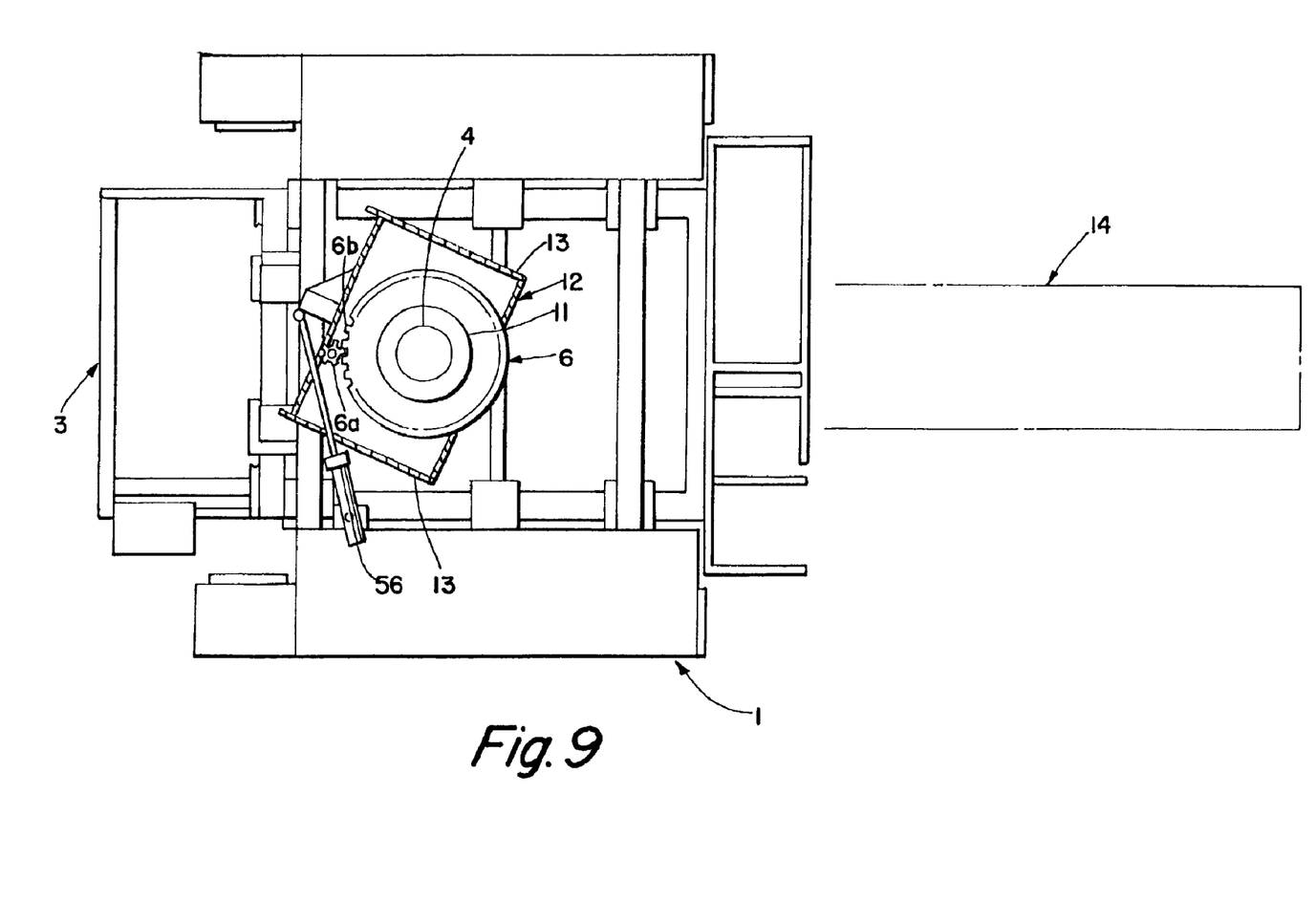
FIG. 9 is a sectional view taken along line 9—9 of FIG. 10.
Figure 10:
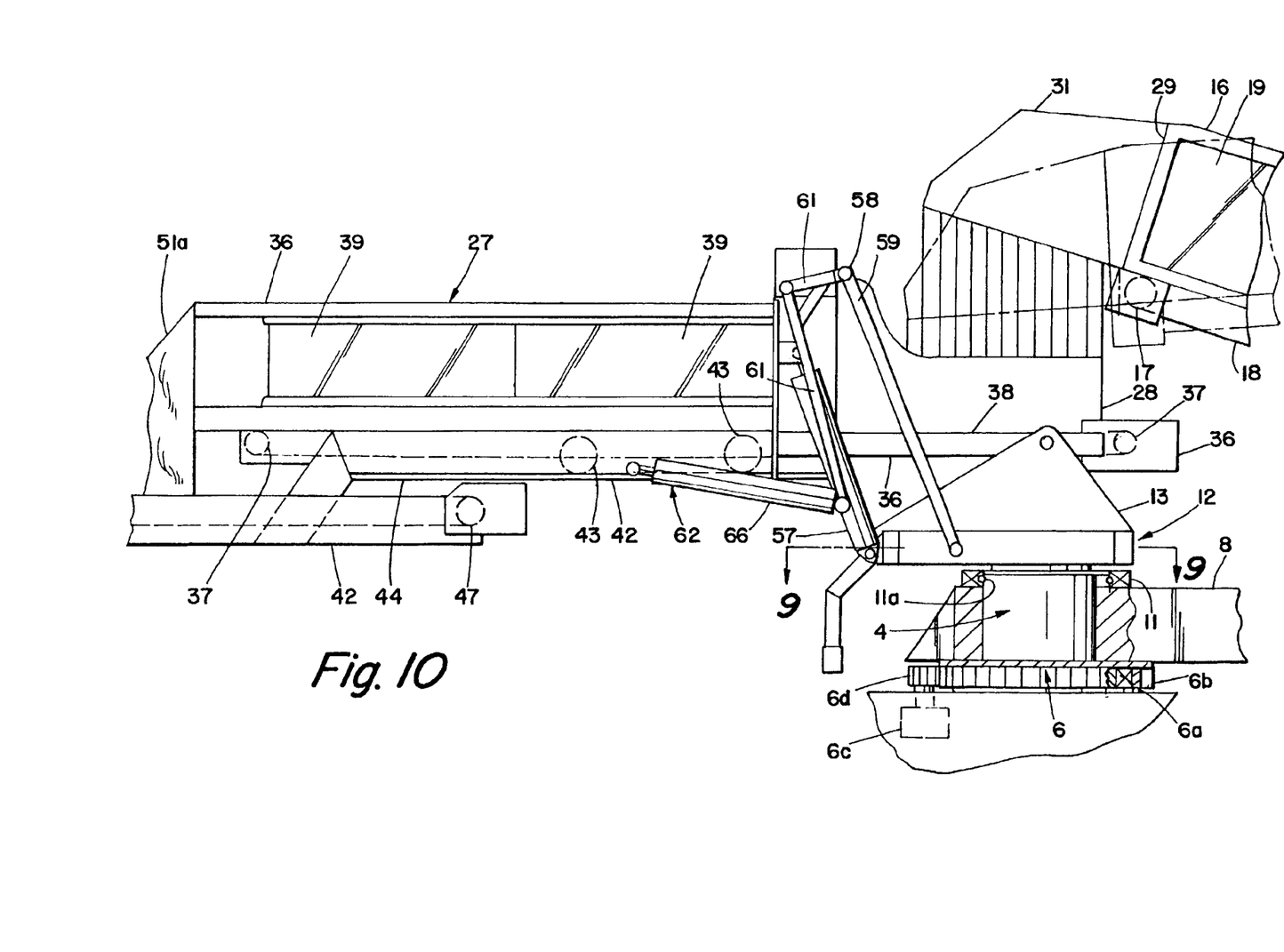
FIG. 10 is a detailed side view of the present invention.
Figure 11:
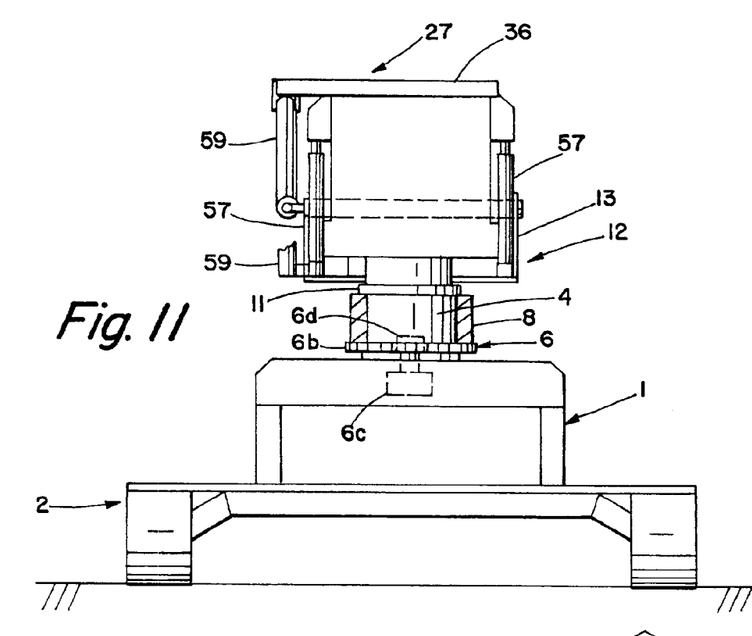
FIG. 11 is a sectional view taken along line 11—11 of FIG. 8.

Referring to the drawing for a clearer understanding of the invention it should be noted in FIG. 1 that the present invention contemplates the use of a mobile frame 1. The frame 1 shown includes tracks 2 driven by a diesel engine 3; however, other power sources and the use of wheels instead of tracks are equally anticipated. As shown in FIGS. 9–11 the frame 1 includes a post 4 about which a primary slewing ring 6 is mounted by bearings 6a for rotational movement about a vertical axis. As shown in FIGS. 1 and 7, a primary slewing frame 7 is connected to the first slewing ring 6 and includes a support member 8 connected to the primary slewing ring 6 and extending horizontally therefrom. The primary slewing frame 7 also includes two fulcrum members 9 connected to the support member 8 opposite the primary slewing ring 6 and in vertically angular relation to the support member 8.

A secondary slewing ring 11 is mounted to the post 4 using bearings 11a for rotational movement thereabout. The primary slewing ring 6 and the secondary slewing ring 11 are mounted to the post 4 in coaxial relation thereto and to each other. A secondary slewing frame 12 is mounted to the secondary slewing ring 11 and includes two plates 13 connected to said secondary slewing ring 11 and extending upwardly therefrom. The two plates 13 are positioned in parallel and diametrically opposing relation above said secondary slewing ring 11.

Figure 14:
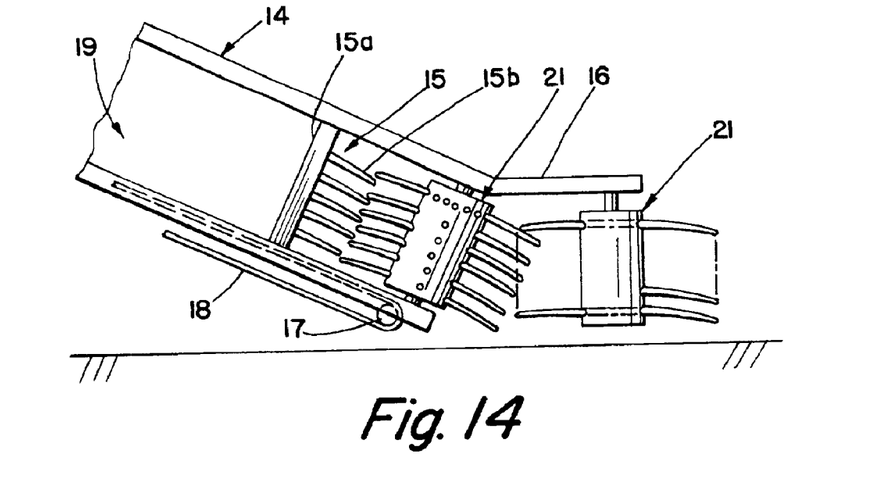
FIG. 14 is a detailed side view of the forward conveyor.
Figure 15:
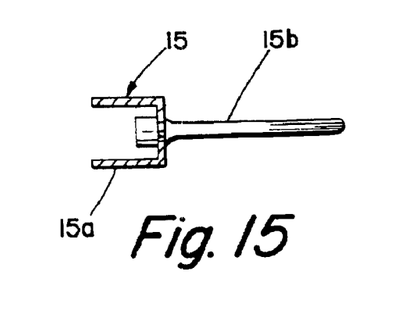
FIG. 15 is a sectional view taken along line 15—15 of FIG. 16.
Figure 16:
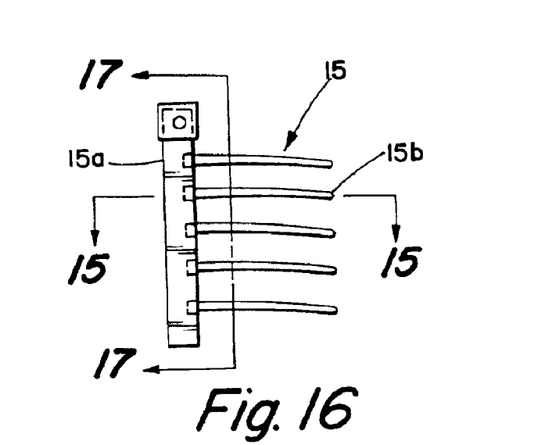
FIG. 16 is a detailed side view of a comb.
Figure 17:
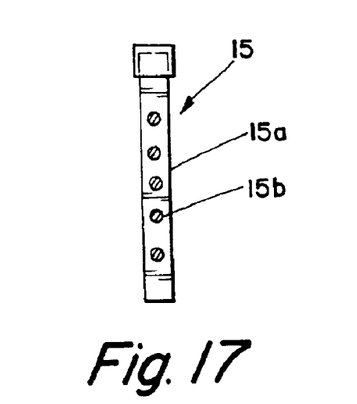
FIG. 17 is a sectional view taken along line 17—17 of FIG. 16.
Figure 18:
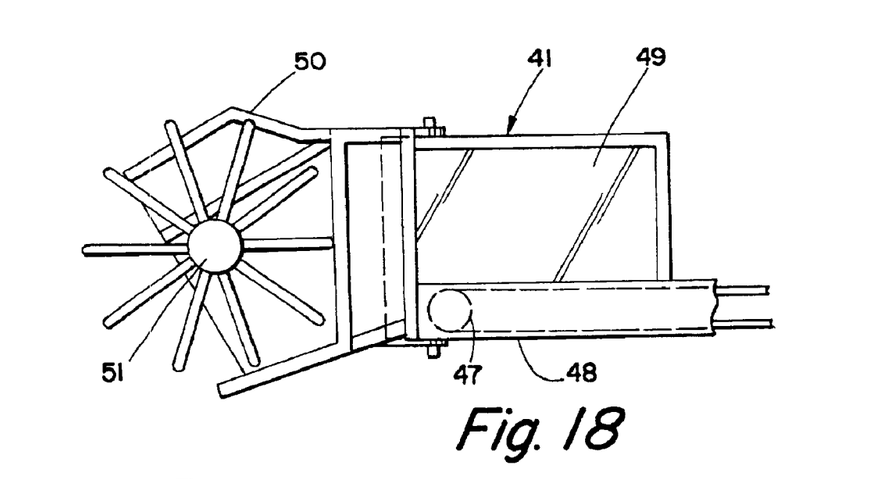
FIG. 18 is a detailed side view of the rearward conveyor and carriage.
Figure 19:
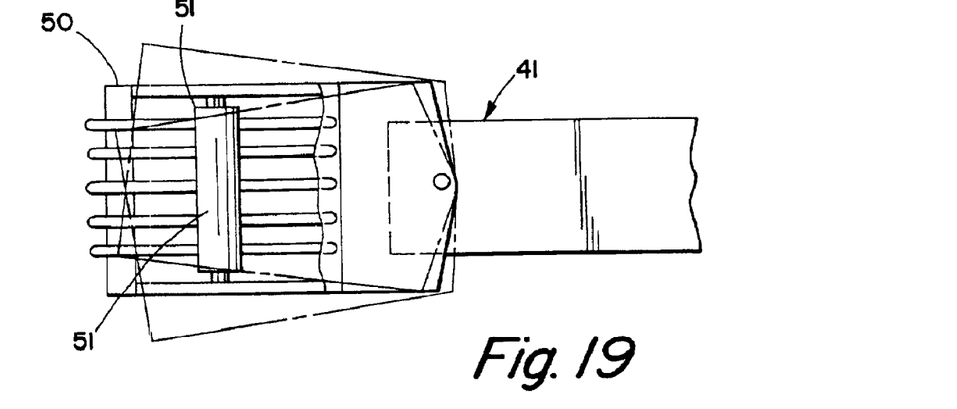
FIG. 19 is a plan view of the carriage with lateral movement of the carriage shown in phantom.

A forward conveyor 14 is pivotally connected to the fulcrum members 9 for pivotal movement about a horizontal axis. The forward conveyor 14 includes a forward conveyor frame 16 pivotally mounted to the fulcrum member 9, a plurality of forward rollers 17 mounted within said forward conveying frame 16 for rotational movement and a forward conveyor belt 18 supported by the forward rollers 17 for continuous movement thereabout and along the forward conveyor frame 16. The forward conveyor 14 also includes a forward cover 19 connected to the forward conveyor frame 16 for containing the fowl as they are transported on the forward conveyor belt 18. As shown in FIG. 14 each side of the forward conveyor 14 includes a comb 15 connected to the forward conveyor frame 16 proximate the forward rollers 17. The forward rollers 17 rotate through the combs 15 which usually will restrict the fowl to the forward conveyor 14. If the fowl become overly crowded, the combs 15 will flex to permit the rollers 17 to discharge the fowl from the forward conveyor. As shown in FIGS. 15–16, each comb includes a base 15a to which a plurality of flexible teeth 15b are connected.

A plurality of forward fingered drums 21 are rotatably mounted to the forward conveyor frame 16 for rotary movement about substantially parallel axis. The forward fingered drums 21, the forward rollers 17 and, consequentially, the forward conveyor belt 18 are driven by hydraulic motors (not shown) which are controlled remotely by control apparatus (not shown) commonly known in the industry to regulate the operating speed of the rollers 17, belt 18 and drums 21. The primary slewing ring 6 defines a plurality of teeth 6b. A hydraulic motor 6c is mounted within the frame 1 and drives a cog 6d which engages the teeth 6b for selectively urging the primary slewing ring 6, the support member 8, the fulcrum members 9, and the forward conveyor 14 in rotational movement about a vertical axis.

A pair of lift arms 23 are each pivotally connected to a lower end of the fulcrum members 9 and are slidably connected to the forward conveyor frame 16. Particularly, each lift arm includes a slide plate 24 pivotally connected to each lift arm 23 and slidably mounted to the forward conveyor frame 16 for sliding movement there along. A first hydraulic piston and shaft assembly 26 is pivotally connected to each fulcrum member 9 and to a corresponding lift arm 23 for urging the forward conveyor 14 about a horizontal axis.

Figure 8:
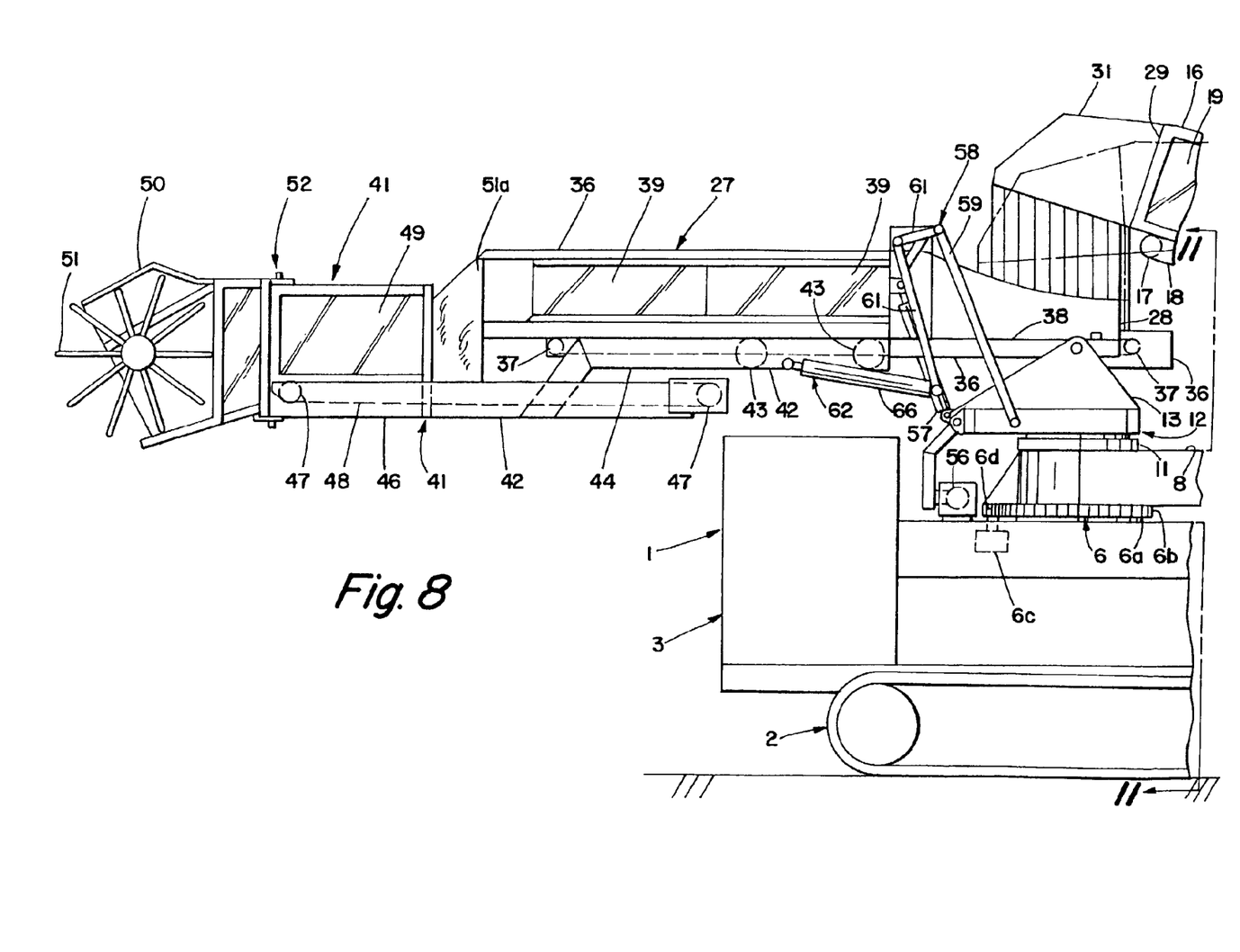
FIG. 8 is a detailed side view of the present invention.
Figure 12:
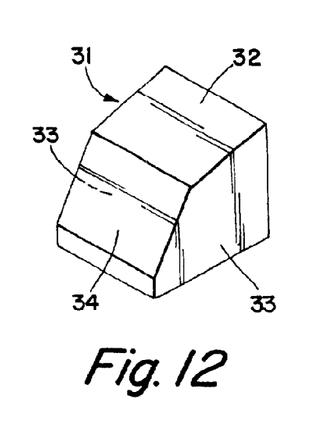
FIG. 12 is a detailed perspective view of a discharged hood.
Figure 13:
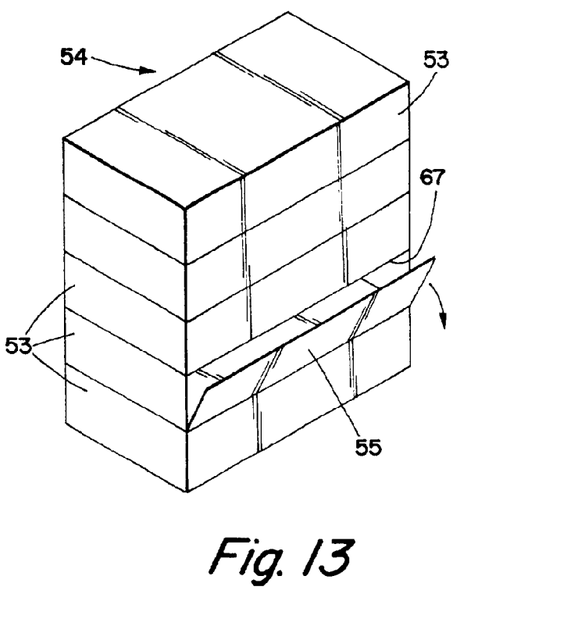
FIG. 13 is a perspective view of a storage cage.

As shown in FIGS. 7 and 8, a receiving end 28 of a first rearward conveyor 27 is pivotally connected to the plates 13 for pivotal movement about a horizontal axis: The receiving end 28 is positioned just below a rearward end 29 of the forward conveyor 14. A discharge hood 31 is connected to the rearward end 29 of the forward conveyor 14 and to the forward cover 19. As shown in FIG. 12, the discharge hood 31 includes a top panel 32 connected to and supported by two side panels 33 and a rear panel 34 connected to the side panels 33 and top panel 32 opposite the forward conveyor belt 18. The side panels 33 and rear panel 34 limit the horizontal movement of the fowl as they are discharged from the forward conveyor belt 18 but allow the fowl to drop downward onto the receiving end 28 of the rearward conveyor 27.

The first rearward conveyor 27 includes a first rearward conveyor frame 36 pivotally connected to the plates 13 for pivotal movement about a horizontal axis. A plurality of first rearward rollers 37 are rotatably mounted within the first rearward conveyor frame 36 for rotary movement about horizontal axis. A rearward conveyor belt 38 is supported by the first rearward rollers 37 for continuous movement thereabout and along the rearward conveyor frame 36. A first rearward cover 39 is connected to the first rearward conveyor frame 36 and extends therealong to contain the fowl on the first rearward conveyor belt 38 as the fowl are transported thereon.

A second rearward conveyor 41 is slidably connected to the first rearward conveyor 27 for sliding movement relative thereto. Particularly, the second rearward conveyor 41 includes a second rearward conveyor frame 42 which is supported by a plurality of extension rollers 43 rotatably mounted to the sides of the first rearward conveyor frame 36. The second rearward conveyor frame 42 includes a pair of roller engaging members 44 which are supported by the extension rollers 43 and which depend below the first rearward conveyor frame 36 and connect to and support a main conveyor frame 46 which also forms a portion of the second rearward conveyor frame 42. A plurality of second rearward rollers 47 are rotatably mounted to the main conveyor frame 46. A second rearward conveyor belt 48 is supported on the second rearward rollers 47 for continuous movement thereabout and along the main conveyor frame 46.

A second rearward cover 49 is connected to the main conveyor frame 46 for containing fowl on the second rearward conveyor belt 48. A flexible membrane 51a is connected to the first rearward cover 39 and the second rearward cover 49 to guide fowl, discharged from the first rearward conveyor 27 onto the second rearward conveyor 41.

As shown in FIGS. 18–20, and FIG. 2, a rearward fingered drum 51 is rotatably mounted to a discharge carriage 50 which in turn is pivotally mounted to a discharge end 52 of the second rearward conveyor 41. The drum 51 is mounted for movement about a horizontal axis to engage fowl brought in contact with the drum 51 and to discharge the fowl from the present invention and into selected compartments 53 of a storage cage 54 positioned adjacent the present invention. Each compartment 53 includes a door 55 which is manually opened to access the interior of the compartment 53. The discharge carriage 50 may be selectively pivoted about a substantially vertical axis by a hydraulic motor (not shown).

A slewing hydraulic piston and shaft assembly 56 is connected to the frame 1 and the secondary slewing frame 12 for selectively urging the secondary slewing ring 11, the secondary slewing frame 12, the first rearward conveyor 27 and the second rearward conveyor 41 about a vertical axis. A pair of second hydraulic piston and shaft assemblies 57 are connected to the secondary slewing frame 12 and to the first rearward conveyor frame 36 for selectively urging the first rearward conveyor 27 and the second rearward conveyor 41 about a horizontal axis.

A linkage 58 is connected to the secondary slewing frame 12, the first rearward conveyor 27 and the second rearward conveyor 41 for automatically urging the second rearward conveyor 41 in sliding extension from beneath the first rearward conveyor 27 and sliding retraction beneath the first rearward conveyor 27 concurrently with and responsive to the pivotal movement of the first rearward conveyor 27 in an upward and downward direction, respectively. The linkage 58 includes a first linkage member 59 pivotally connected to the secondary slewing frame 12, a second linkage member 61 pivotally connected to the first linkage member 59 and pivotally connected to the first rearward conveyor frame 36 and a third linkage member 62 pivotally connected to the second linkage member 61 and pivotally connected to the second rearward conveyor 41. The second linkage member 61 is angular, having first and second linkage arms 63 and 64 joined at a preselected angle. The second linkage member 61 is pivotally connected to the first rearward conveyor frame 36 at the joinder of the linkage arm 63 and 64. In the preferred embodiment, the third linkage member 62 includes a piston and shaft assembly 66. The piston and shaft assembly 66 may be selectively extended and retracted using control apparatus (not shown) to selectively adjust the extension and retraction of the second rearward conveyor 41 relative to the first rearward conveyor 27. It should be noted that the use of a linkage wherein the third linkage member does not include a piston and shaft assembly is also anticipated and provides a new and useful improvement not shown in the prior art. The use of the piston and shaft assembly 66 as a part of the third linkage member 62 is an additional and separate improvement over the prior art.

Note that the piston and shaft assemblies 26, 56, 57 and 66 are all independently operated by control apparatus (not shown). Additionally, the rearward fingered drums 51 are independently controlled by control apparatus (not shown) and hydraulic motors (not shown) commonly available in the industry.

OPERATION OF THE INVENTION

The present invention is typically operated by two operators. One operator typically controls the operating speed of the forward fingered drums 21, the operating speed of the forward rollers 17 and, thus, the operating speed of forward conveyor belt 18. The first operator also controls the vertical rotation of the forward conveyor 14, via operation of the first piston and shaft assemblies 26; the horizontal positioning of the forward conveyor 14, via the operation of the hydraulic motor 6c; and the operation of track 2 and diesel engine 3 to control the movement of the frame 1.

A second operator controls the horizontal movement of the first and second rearward conveyors 27 and 41, via operation of the slewing piston and shaft assembly 56; the vertical movement of the first and second rearward conveyors 27 and 41, via the operation of the second piston and shaft assembly 57 and the selective extension and retraction of the second rearward conveyor 41, via operation of the piston and shaft assembly 66. The second operator also controls the speed at which the rearward fingered drum 51, the first rearward rollers 37, the first rearward conveyor belt 38, the second rearward rollers 47 and the second rearward conveyor belt 48 operate.

In operation, the forward fingered drums 21 are brought in contact with a group of fowl. The forward fingered drums 21, rotating in opposite directions, engage the fowl one by one and thrust each one onto the forward conveyor belt 18. The forward conveyor belt 18 is preferably operated at a speed that will transport the fowl away from the forward fingered drums 21 at a rate greater than the rate the forward fingered drums 21 are thrusting fowl onto the forward conveyor belt 18. Managing the speeds in this manner prevents overcrowding and thus facilitates a steady stream of fowl.

The grouping of the fowl is not a static arrangement. Whether the fowl are herded to one end of a contained space or herded through a confined space in close proximity to the present inventions, the group of fowl undulates to some degree requiring the operator to periodically move the forward conveyor 14 left and right to maintain the forward fingered drums 21 in contact with the group of fowl. This is facilitated by selectively engaging the hydraulic motor 6c in a forward or reverse operation which, as set forth above urges the primary slewing ring 11, primary slewing frame 7, and forward conveyor 14 in horizontal rotational movement about the frame 1.

The fowl are moved along the forward conveyor 14 being contained thereon by the forward cover 19. When the fowl reach the rearward end 29, the fowl fall to the receiving end 28 of the first rearward conveyor 27. The discharge hood 31 contains the fowl above the receiving end 28 but allows the fowl to drop downward thereon.

The mounting of the primary and secondary slewing rings 6 and 11 and frames 7 and 12 to pivot about a singular vertical axis at all times maintains the rearward end 29 of the forward conveyor above the receiving end 28 of the first rearward conveyor 27 irregardless of the horizontal positioning of either the forward conveyor 14 or the first rearward conveyor 27 or both. This advantage is particularly useful as the operator can activate the slewing piston and shaft assembly 56 to rotate the rearward conveyors 27 and 41 thus positioning the discharge end 52 of the rearward conveyor 41 and the rearward fingered drums 51 mounted adjacent thereto proximate multiple storage cages 54 placed about the frame 1 in various radial relations thereto. This advantage allows the operator to fill one cage 54, using methods discussed below, then immediately rotate the second rearward conveyor 41 adjacent an empty cage 54, with minimal interruption of the loading process.

The fowl are transported on the first rearward conveyor belt 38, being contained thereon by the first rearward cover 39. The fowl are discharged from the first rearward conveyor belt 38 and onto the second rearward conveyor belt 48 and are contained thereon by the second rearward cover 49. The membrane 51a insures that the fowl pass safely from the first rearward conveyor 27 to the second rearward conveyor 41 while accommodating the extension and retraction of the second rearward conveyor 41. The fowl are moved by the second rearward conveyor belt 48 to the rearward fingered drum 51 which engages and discharge the fowl into the selected compartment 53 of a selected one of the storage cages 54. The operator can control the speed of the first and second rearward rollers 37 and 42 and, consequently, the speed of the first and second rearward conveyor belts 38 and 48 to facilitate optimal flow of the fowl. The speed of the rearward fingered drum 51 can also be controlled to ensure that fowl are discharged at a rate greater than that rate the fowl are delivered by the second rearward conveyor 51.

Figure 2:
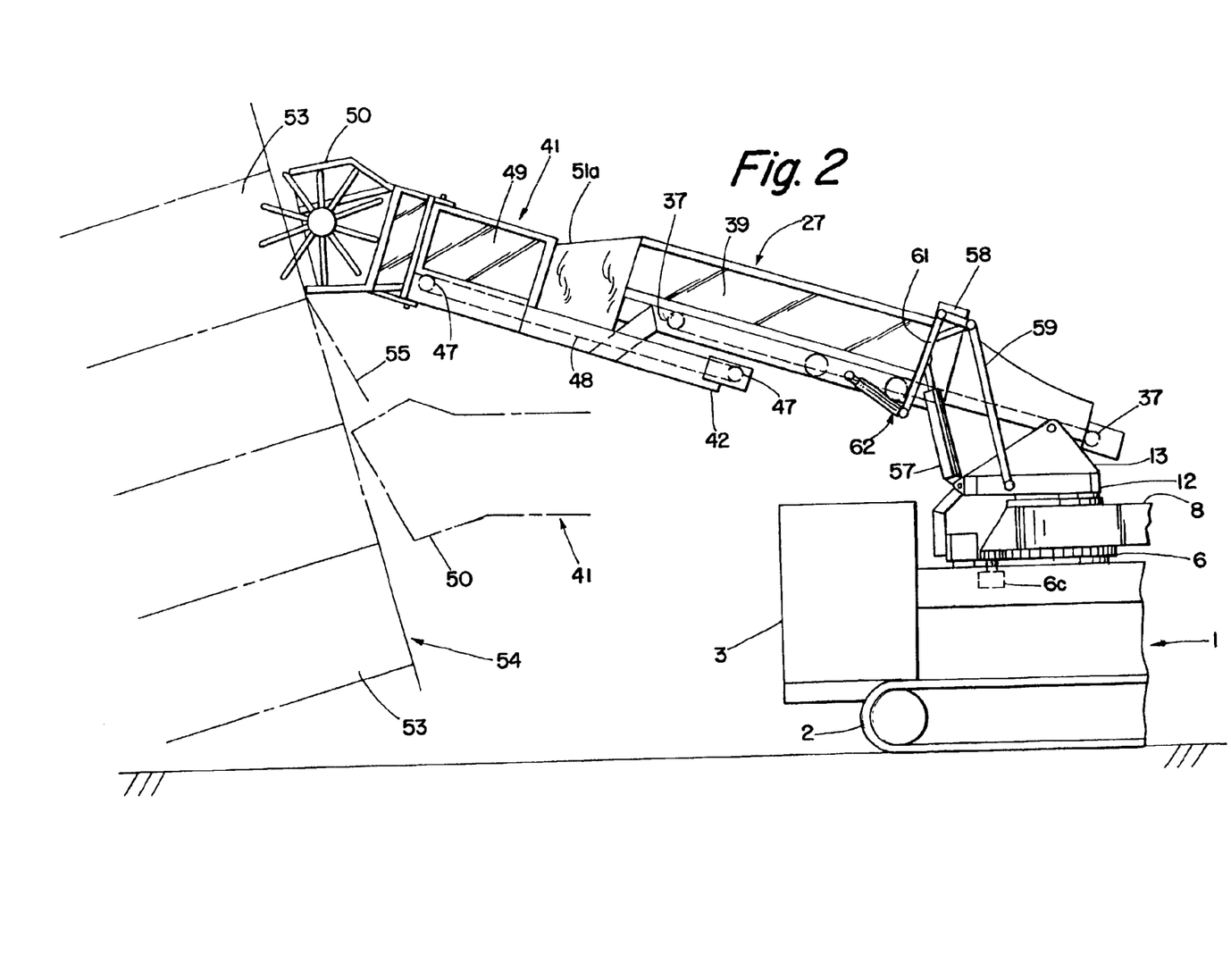
FIG. 2 is a detailed side view of the present invention proximate a storage cage.
Figure 3:
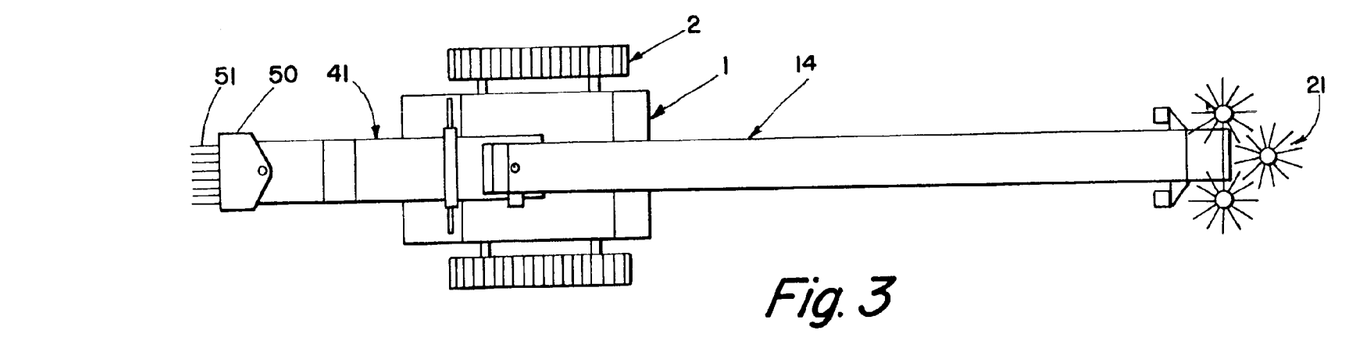
FIG. 3 is a plan view of the present invention.
Figure 4:
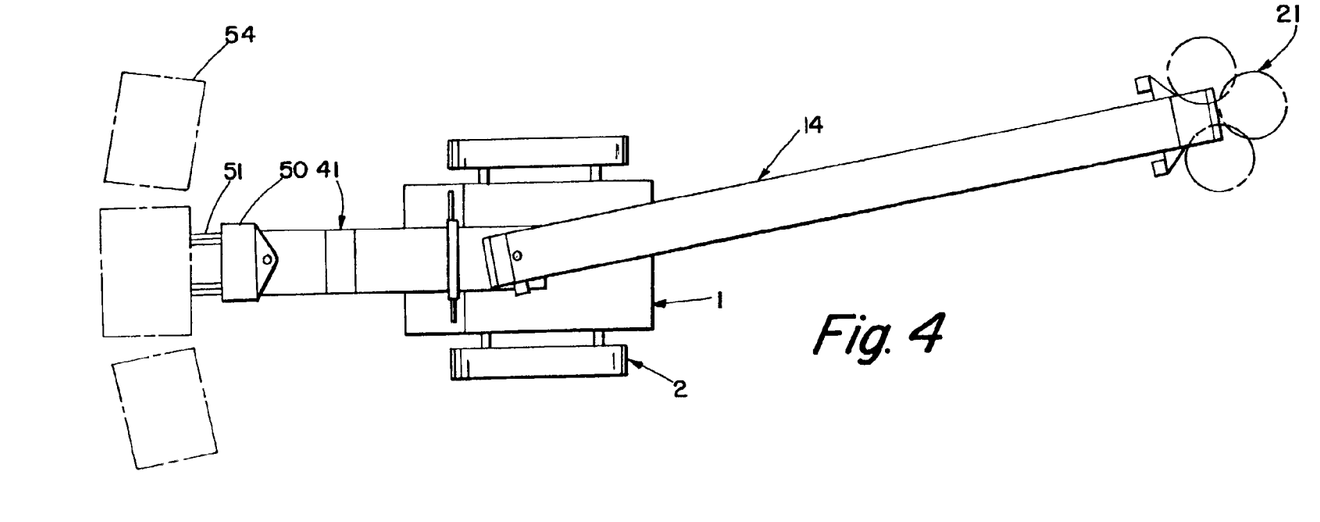
FIG. 4 is a plan view of the present invention with the forward conveyor pivoted laterally.
Figure 5:
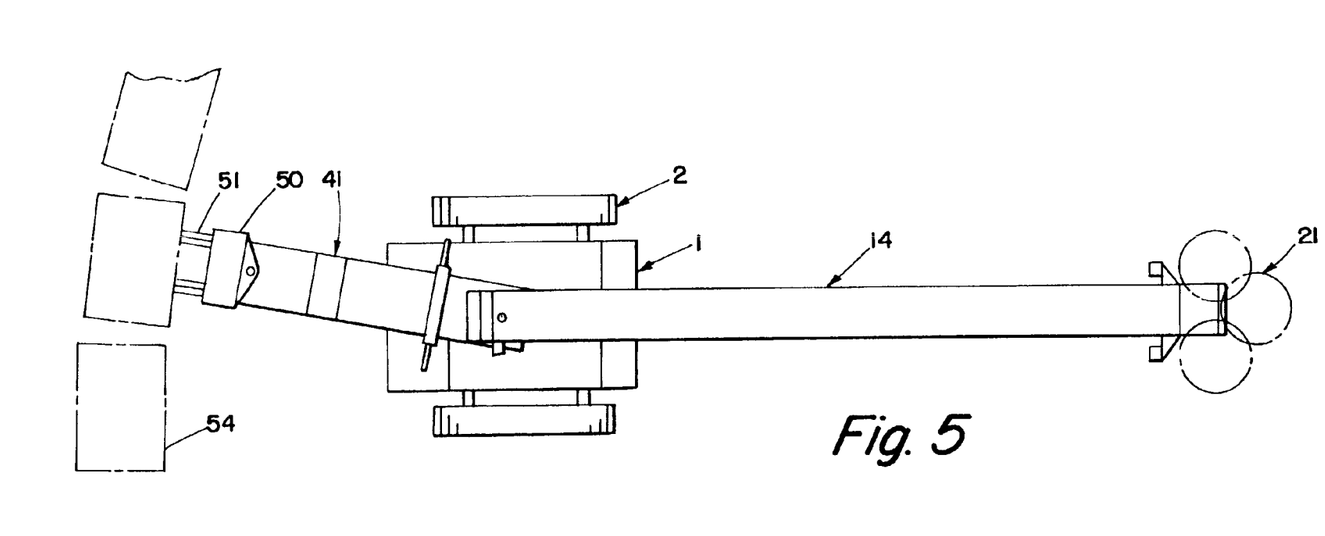
FIG. 5 is a plan view of the present invention with the rearward conveyor pivoted laterally.
Figure 6:
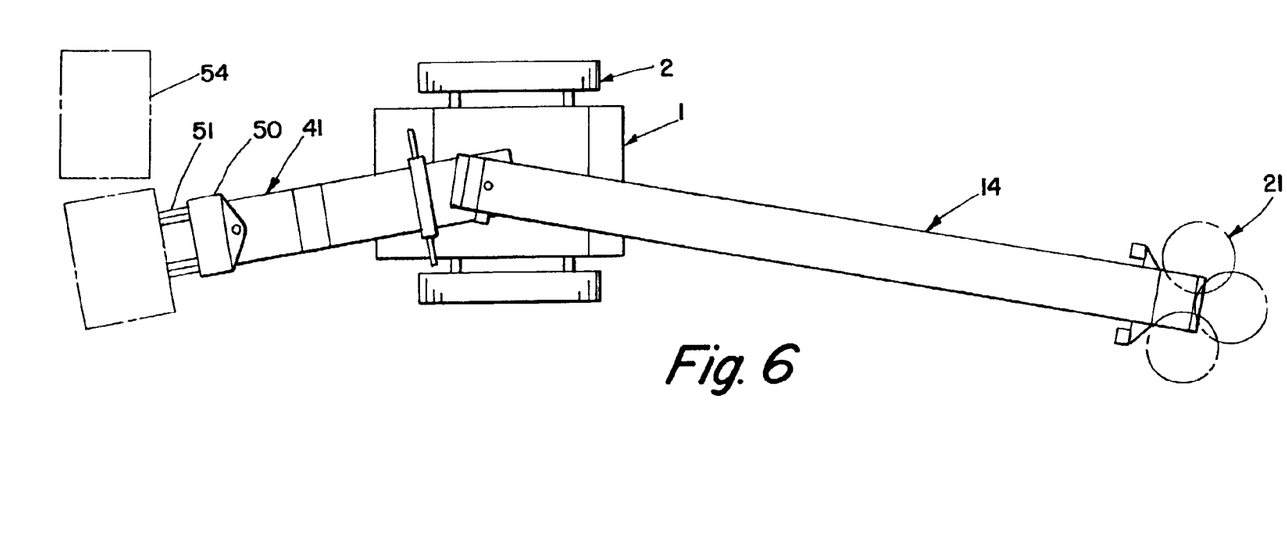
FIG. 6 is a plan view of the present invention with both the forward and rearward conveyors pivoted laterally.

The storage cages 54 can be loaded from top to bottom or vice versa. For the purpose of example, FIG. 2 shows a storage cage 54 being loaded bottom to top. The compartments 53 each define an opening 67 and have a door 68 for purposes of access and closure, respectively. The rearward conveyors 27 and 41 are moved to a preselected lower position(shown in phantom in FIG. 2 where the second rearward conveyor 41 is completely retracted by the linkage 58. The storage cage 54 is positioned adjacent the rearward fingered drum 51 which, as set forth above, discharges fowl into the lowest one of the compartments 53. When the lowest compartment is filled, the rearward conveyors 27 and 41 are pivoted upward to the next compartment. The linkage automatically urges the second rearward conveyor 41 from the frame 1 to maintain the rearward fingered drum 51 in close proximity to the openings 67 which optimally are positioned within a preselected vertical plane adjacent which the rearward fingered drums 51 will be automatically maintained. Rearward conveyors 27 and 41 are pivoted upward in this manner until all the compartments 53 are filled. The rearward conveyors 27 and 41 are then pivoted horizontally to another storage cage 54 where the process is then repeated. Once a cage 54 is filled, it is moved from the present invention and replaced with another cage 54.

Figure 20:
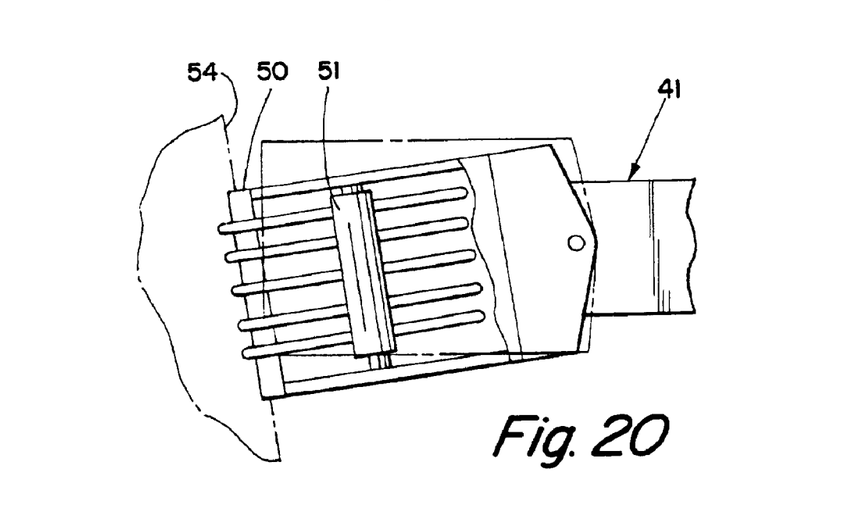
FIG. 20 is a plan view of the carriage pivoted laterally and in close proximity to the storage cage.

Note that positioning of the storage cages 54 is not an extract science and the openings are sometimes not positioned exactly within the preselected vertical plane adjacent which the rearward fingered drum 51 will be automatically positioned. To accommodate this irregularity, the piston and shaft assembly 66 can be selectively extended or retracted by the operator to adjust the position of the second rearward conveyor 41 and thus position the rearward fingered drum 51 in close proximity to the openings 67. Also, as is shown in FIG. 20, the discharge carriage 50 may be pivoted laterally to accommodate a more exact alignment.

While I have shown my invention in a preferred form, it will be obvious to those skilled in the art that it is not so limited but is susceptible to various changes and modifications without departing from the spirit thereof.

What I claim is:

1. An apparatus for capturing, conveying and loading fowl into selected compartments of a plurality of storage cages, comprising:
   a) frame;
   b) forward conveying means pivotally mounted to said frame for sweeping rotation about a vertical axis to capture said fowl from points forward and laterally of said frame and convey said fowl to said vertical axis;
   c) rearward conveying means pivotally mounted to said frame, independent of an subjacent said forward conveying means, for rotation about said vertical axis to receive said fowl from said forward conveying means and convey said fowl from said frame to discharge said fowl into selected ones of said compartments forming said storage cages, wherein said rearward conveying means is also pivotally mounted to said frame for movement about a horizontal axis to accommodate the discharge of said fowl into said compartments which may be disposed in numerous and varied positions both vertically and laterally in relation to said frame pivot means rotatably mounted to said frame and to which said forward and rearward conveying means are mounted to accommodate independent pivotal movement of said forward and rearward conveying means about said vertical axis and wherein said vertical axis extends through a rearward end of said forward conveying means from which said fowl are discharged and a receiving end of said rearward conveying means irregardless of the angular relationship, both vertically and horizontally of said forward and rearward conveying means.

2. An apparatus as described in claim 1 wherein said forward and rearward conveying means are each pivotally mounted to said pivot means for vertical motion relative thereto.

3. An apparatus as described in claim 2 wherein said pivot means comprises:
   a) a primary slewing ring mounted to said frame for rotation about a vertical axis,
   b) a primary slewing frame connected to said primary slewing ring and pivotally connected to said forward conveying means,
   c) a secondary slewing ring rotatably mounted to said frame in coaxial relation to said primary slewing ring, and d) a secondary slewing frame connected to said secondary slewing ring and pivotally connected to said rearward conveyor means.

4. Apparatus as described in claim 3 wherein said primary slewing frame comprises:
   a) a support member connected to said primary slewing ring and extending horizontally therefrom, and
   b) one or more fulcrum members connected to said support member opposite said primary slewing ring and in vertically angular relation to said support member, wherein said forward conveying means is pivotally connected to an upper end of said one or more fulcrum members for rotational movement about a horizontal axis.

5. Apparatus as described in claim 4 further comprising first means connected to said primary slewing frame and to said forward conveying means for urging said forward conveying means about said horizontal axis.

6. An apparatus as described in claim 5 wherein said first urging means comprises:
   a) one or more lift arms pivotally connected to a lower end of said fulcrum members and slidably connected to said forward conveying means; and
   b) a plurality piston and shaft assemblies pivotally connected to said fulcrum members and to said lift arms for selectively urging said lift arms about a horizontal axis and, correspondingly, rotating said forward conveyor vertically about another horizontal axis located proximate said upper ends of said fulcrum members.

7. An apparatus as described in claim 3 wherein said secondary slewing frame comprises one or more plates pivotally connected to said rearward conveying means.

8. An apparatus as described in claim 7 further comprising second means pivotally connected to said secondary slewing frame and to said rearward conveying means for urging said rearward conveying means about a horizontal axis.

9. An apparatus as described in claim 8 wherein said second urging means comprises one or more second piston and shaft assemblies pivotally connected to said secondary slewing frame and to said rearward conveying means.

10. An apparatus as described in claim 3 wherein said secondary slewing frame comprises one or more vertically disposed plates pivotally connected to said rearward conveying means.

11. An apparatus as described in claim 10 wherein said rearward conveying means comprises;
   a) a first rearward conveyor pivotally connected to said one or more vertical plates for pivotal motion about a horizontal; and
   b) a second rearward conveyor slidably connected to said first rearward conveyor for sliding movement relative thereto.

12. An apparatus as described in claim 11 comprising means for automatically urging said second rearward conveyor in sliding movement relative to said first rearward conveyor concurrently with and proportionately responsive to the pivotal movement of said first rearward conveyor about a horizontal axis.

13. An apparatus as described in claim 12 wherein said automatic urging means comprises;
   a) a first linkage member pivotally connected to said secondary slewing frame;
   b) a second linkage member pivotally connected to said first linkage member and pivotally connected to said first rearward conveyor; and;
   c) a third linkage member pivotally connected to said linkage member and connected to said second rearward conveyor.

14. An apparatus as described in claim 13 wherein said second linkage member comprises:
   a) a first linkage arm pivotally connected to said first rearward conveyor and pivotally connected to said first linkage member; and
   b) a second linkage arm pivotally connected to said first rearward conveyor and pivotally connected to said third linkage member, wherein said first linkage arm is connected to said second linkage arm and extends therefrom in fixed angular relation thereto.

15. An apparatus as described in claim 13 wherein said third linkage member comprises means for selectively urging said second rearward conveyor in sliding motion relative to said first rearward conveyor.

16. An apparatus as described in claim 13 wherein said third linkage member comprises a piston and shaft assembly for selectively urging said second rearward conveyor in sliding motion relative to said first rearward conveyor.

17. An apparatus as described in claim 3 further comprising means connected to said secondary slewing frame for urging said rearward conveying means about said horizontal axis.

18. An apparatus as described in claim 1 wherein said forward conveying means comprises:
   a) forward conveyor frame pivotally mounted to said frame;
   b) a plurality of rollers mounted within said forward conveyor frame for rotational movement;
   c) a forward conveyor belt supported by said forward rollers in pressed contact therewith such that rotation of one or more of said forward rollers will urge said belt in continuous motion about said forward rollers and along said forward frame; and
   d) forward gathering means connected to said forward conveyor frame for engaging one or more of said fowl and thrusting said fowl onto said forward conveyor belt so that said fowl are transported on said forward conveyor belt from said gathering means to a rearward end of said forward conveying means which is disposed above a receiving end of said rearward conveying means and wherein said fowl are discharged from said rearward end of said forward conveying means and fall vertically to said receiving end of said rearward conveying means.

19. An apparatus as described in claim 18 wherein said forward gathering means comprises a plurality of forward fingered drums rotatably mounted to said forward conveyor frame for rotary movement about substantially parallel axis wherein each of said drums are driven in opposite rotary directions relative to adjacent others of said drums.

20. An apparatus as described in claim 19 further comprising a pair of flexible combs each connected to opposite sides of said forward conveyor frame and proximate said plurality of forward fingered drums for containing said fowl on said forward conveyor belt, wherein each comb includes flexible teeth which will bend to allow the discharge of fowl from said forward conveyor when said fowl exceed a predetermined density thereon.

21. An apparatus as described in claim 18 further comprising a discharge hood connected to said rearward end of said forward conveyor frame and defining a top panel connected to and supported by two side panels which are connected to said forward conveyor frame and positioned laterally of said forward conveyor belt, and a rear panel connected to said side panels and said top panel opposite said forward conveyor belt wherein said top, rear and side panels limit horizontal movement of fowl discharged from said forward conveyor belt but allow said fowl to drop downward from said forward conveyor belt and onto said receiving end of said rearward conveying means.

22. An apparatus as described in claim 1 wherein said rearward conveying means comprises:
   a) a first rearward conveyor pivotally mounted to said frame for pivotal movement about a horizontal axis and a vertical axis;
   b) a second rearward conveyor slidably connected to said first rearward conveyor for sliding telescopic extension and retraction relative thereto; and
   c) automatic urging means connected to said first and second rearward conveyors for automatically urging said second rearward conveyor and sliding motion relative to said first rearward conveyor concurrently with and proportionately responsive to the pivotal movement of said rearward conveying means about said horizontal axis.

23. An apparatus as described in claim 22 wherein said automatic urging means comprises a plurality of linkage members, each pivotally connected to one of the others of said plurality of linkage members and wherein one of said linkage members is pivotally connected to said second rearward conveyor and another of said linkage members is connected to said first rearward conveyor.

24. An apparatus as described in claim 23 wherein said second linkage member comprises a first linkage arm pivotally connected to said first linkage member and a second linkage arm pivotally connected to said third linkage member, wherein said first linkage arm is joined to said second linkage arm in fixed angular relation thereto.

25. An apparatus as described in claim 22 wherein said automatic urging means comprises;
   a) a first linkage member pivotally secured to a secondary slewing ring, wherein said secondary slewing ring is rotatably mounted to said frame for rotation about a vertical axis and is pivotally connected to and supports said first rearward conveyor;
   b) a second linkage member pivotally connected to said first linkage member and pivotally connected to said first rearward conveyor; and
   c) a third linkage member pivotally connected to said second linkage member and pivotally connected to said second rearward conveyor, wherein upward pivotal movement of said first rearward conveyor will, via said first, second and third linkage members, urge said second rearward conveyor in sliding motion along said first rearward conveyor and away from said frame and wherein downward pivotal movement of said first rearward conveyor will urge said second rearward conveyor in sliding motion along said first rearward conveyor and toward said frame.

26. An apparatus as described in claim 25 wherein said third linkage member comprises a piston and shaft assembly pivotally connected to said second linkage member and pivotally connected to said second rearward conveyor.

27. An apparatus as described in claim 22 comprising means for selectively urging said second rearward conveyor in sliding motion relative to said first rearward conveyor.

28. An apparatus as described in claim 22 wherein said automatic urging means comprises means for selectively urging said second rearward conveyor in sliding motion relative to said first rearward conveyor.

29. An apparatus as described in claim 27 or claim 28 wherein said selective urging means comprises a piston and shaft assembly pivotally connected to said second rearward conveyor.

30. An apparatus for as described in claim 22 further comprising means connected to said second rearward conveyor for discharging said fowl from said second rearward conveyor.

31. An apparatus as described in claim 30 wherein said discharging means includes a discharge carriage pivotally connected to said second rearward conveyor for movement about a substantially vertical axis and laterally of the second rearward conveyor; and a rearward fingered drum rotatably connected to said discharge carriage for engaging said fowl and discharging said fowl from said second rearward conveyor.

32. An apparatus for the capturing and loading of fowl comprising:
   a) a frame;
   b) a first rearward conveyor pivotally mounted to said frame for pivotal movement about a horizontal axis;
   c) a second rearward conveyor slidably connected to said first rearward conveyor for sliding telescopic movement relative thereto; and
   d) means mounted to said first and second rearward conveyors for automatically urging said second rearward conveyor in sliding telescopic movement relative to said first rearward conveyor concurrently with and proportionately responsive to the pivotal movement of said first rearward conveyor.

33. An apparatus as described in claim 32 wherein said automatic urging means comprises a plurality of linkage member, each pivotally connected to one of the others of said plurality of linkage members and wherein one of said plurality of linkage members is pivotally connected to said second rearward conveyor and another of said linkage members is connected to said first rearward conveyor.

34. An apparatus as described in claim 32 wherein said automatic urging means comprises;
   a) a first linkage member pivotally secured to said frame,
   b) a second linkage member pivotally connected to said first linkage member and pivotally connected to said first rearward conveyor; and
   c) a third linkage member pivotally connected to said second linkage member and pivotally connected to said second rearward conveyor, wherein upward pivotal movement of said first rearward conveyor will, via said first, second and third linkage members, urge said second rearward conveyor in sliding rotation along said first rearward conveyor and away from said frame and wherein downward pivotal movement of said first rearward conveyor will urge said second rearward conveyor in sliding motion along said first rearward conveyor and toward said frame.

35. An apparatus as described in claim 34 wherein said second linkage member comprises a first linkage arm pivotally connected to said first linkage member and a second linkage arm pivotally connected to said third linkage member, wherein said first linkage arm is joined to said second linkage arm in fixed angular relation thereto.

* * * * *